(12) United States Patent
Barman et al.

(10) Patent No.: US 6,795,200 B1
(45) Date of Patent: Sep. 21, 2004

(54) METHOD AND SYSTEM FOR DIMENSIONING BOXES OR OTHER CUBOID OBJECTS

(75) Inventors: Rod Barman, Vancouver (CA); Stewart Kingdon, Vancouver (CA); Don Murray, Vancouver (CA); Vladimir Tucakov, Vancouver (CA); Malcolm Steenburgh, Vancouver (CA)

(73) Assignee: Point Grey Research Inc., Vancouver (CA)

( * ) Notice: Subject to any disclaimer, the term of this patent is extended or adjusted under 35 U.S.C. 154(b) by 270 days.

(21) Appl. No.: 09/709,366

(22) Filed: Nov. 13, 2000

(51) Int. Cl.[7] ............................................. G02B 5/08
(52) U.S. Cl. ................................................... 356/606
(58) Field of Search ............................ 356/625, 606, 356/607, 622; 382/154

(56) References Cited

U.S. PATENT DOCUMENTS

| | | | |
|---|---|---|---|
| 4,677,302 A | * 6/1987 | Chiu et al. ............. | 250/559.22 |
| 4,701,047 A | * 10/1987 | Eibert et al. ................ | 356/606 |
| 5,056,922 A | 10/1991 | Cielo et al. | |
| 5,102,224 A | * 4/1992 | Uesugi et al. ............... | 356/607 |
| 5,193,120 A | 3/1993 | Gamache et al. | |
| 5,216,476 A | 6/1993 | Lanckton | |
| 5,363,185 A | 11/1994 | Zana | |
| 5,555,090 A | * 9/1996 | Schmutz ..................... | 356/601 |
| 5,753,931 A | 5/1998 | Borchers et al. | |
| 6,044,170 A | 3/2000 | Migdal et al. | |
| 6,064,759 A | * 5/2000 | Buckley et al. ............. | 348/125 |
| 6,377,700 B1 | * 4/2002 | Mack et al. ................. | 382/154 |
| 6,415,051 B1 | * 7/2002 | Callari et al. ............... | 382/154 |

* cited by examiner

Primary Examiner—Georgia Epps
Assistant Examiner—Alicia Harrington
(74) Attorney, Agent, or Firm—Oyen Wiggs Green & Mutala

(57) ABSTRACT

A system for measuring dimensions of cuboid objects may be used to measure dimensions of boxes travelling on a conveyor. The system has a pair of digital cameras which obtain images of one or more lines projected by a projector on upper surfaces of the objects. The height of the upper surfaces can be determined by triangulation. Lengths and widths of the upper surfaces are measured by locating endpoints of the projected lines and fitting rectangles to the located endpoints. The system does not require rigid mounting of the projector relative to the cameras. A third camera may be used to determine speed and direction of the conveyor motion.

39 Claims, 6 Drawing Sheets

METHOD AND SYSTEM FOR DIMENSIONING BOXES OR OTHER CUBOID OBJECTS

TECHNICAL FIELD

This invention relates to a system for measuring the dimensions of boxes or other cuboid objects. In particular, the invention relates to a system which measures the dimensions of objects from images of the objects captured by digital cameras. The invention has particular application in measuring the dimensions of boxes or similar objects travelling along a conveyor.

BACKGROUND

It is sometimes desirable to be able to quickly and automatically measure the dimensions of cuboid objects. For example, courier and shipping companies are called upon to deliver very large numbers of cuboid boxes having various dimensions. It is desirable to be able to measure dimensions of the boxes on the fly to permit segregating the boxes by size; billing based upon size; monitoring the total volume of boxes shipped, or the like. The large number of boxes being shipped makes it difficult to make accurate measurements because very little time is available for each measurement. Further difficulties are caused by the fact that it is generally not desirable to require that boxes be singulated. Typically it is desirable to make measurements of boxes in a single randomly-arranged layer of boxes being carried along a conveyor belt.

Some existing systems place a digital camera above a box to be measured and project a line of light on an upper surface of the box. The line is projected onto the box from a different direction than the line of sight to the camera so that the apparent position of the projected line depends upon the height of the box above a reference surface, such as a conveyor belt on which the box is sitting. An example of such a system is the model DM3000 dimensioning system available from ACCU-SORT SYSTEMS INC. of Telford Pa., USA. Such single lens and single line systems must measure the speed of the conveyor belt in order to complete the dimension determinations. Often an electromechanical odometer or the like is coupled to the conveyor belt for use in measuring the conveyor belt's speed.

This prior art approach has a number of disadvantages. Foremost among these is that the accuracy of the height measurement depends upon the projector which generates the line of light being absolutely rigidly mounted with respect to the camera. Height measurements will be inaccurate if the projector moves or vibrates relative to the camera so that the line of light is displaced to one side or the other in the camera's field of view. This extra displacement from the calibrated normal state could lead to inaccurate measurements, either too small or too large depending on the direction of movement of the projector. To obtain the most accurate results the distance between the camera and projector should be large. This makes it more difficult and expensive to maintain the desired rigidity.

The length and width of the box may be determined from the speed at which the box passes the system. Boxes must be singulated.

There is a need for cost effective methods and systems for measuring the dimensions of objects, such as boxes, which avoid the disadvantages of currently available systems.

SUMMARY OF THE INVENTION

This invention provides methods and systems for measuring the dimensions of cuboid objects. The methods and systems determine heights of the objects above a known plane by projecting light patterns onto top surfaces of one or more objects, obtaining images of the projected patterns at two spaced apart cameras, and determining the heights of the projected patterns by triangulation. The invention facilitates the provision of apparatus for accurately and automatically measuring substantially cuboid objects which is self-contained and robust to external interferences.

Accordingly, one aspect of the invention provides a method for measuring dimensions of cuboid objects. The method comprises: providing a cuboid object having a first face in a known plane; projecting a line of light onto a second face of the object, the second face opposed to the first face; obtaining at first and second spaced apart cameras first and second images of the line of light; and, determining a distance between the line of light and the first plane from the first and second images by triangulation.

In preferred embodiments of the invention, a speed of motion of the objects is determined by using an optical flow technique. Preferably a third digital camera obtains a series of images of the object from which the speed of the object is determined. The speed determination may comprise acquiring first, second and third images of the object, the second image including points corresponding to at least a portion of the line of light; determining a correlation between the first and third images; and measuring a displacement between points on the object in the first and third images corresponding to the line of light in the second image. In preferred embodiments, the method includes transforming the images produced by the third camera so that the apparent optical axis of the third camera is perpendicular to a plane of a top surface of the object prior to determining a correlation between the first and third images. The first second and third images are preferably images in a stream of images.

Another aspect of the invention provides a system for measuring dimensions of cuboid objects. The system comprises: a camera assembly comprising first and second spaced apart digital cameras having a common field of view, the digital cameras rigidly coupled to one another; and, a projector spaced apart from the camera assembly, the projector mounted to project a line of light on an object in the field of view of the cameras. A distance d between the first and second cameras is substantially less than a distance x between the camera assembly and the projector. The projector is not necessarily rigidly affixed to the camera assembly.

Further features and advantages of the invention are described below.

BRIEF DESCRIPTION OF DRAWINGS

In drawings which illustrate non-limiting embodiments of the invention.

DESCRIPTION

Prior Art

Figure 1:
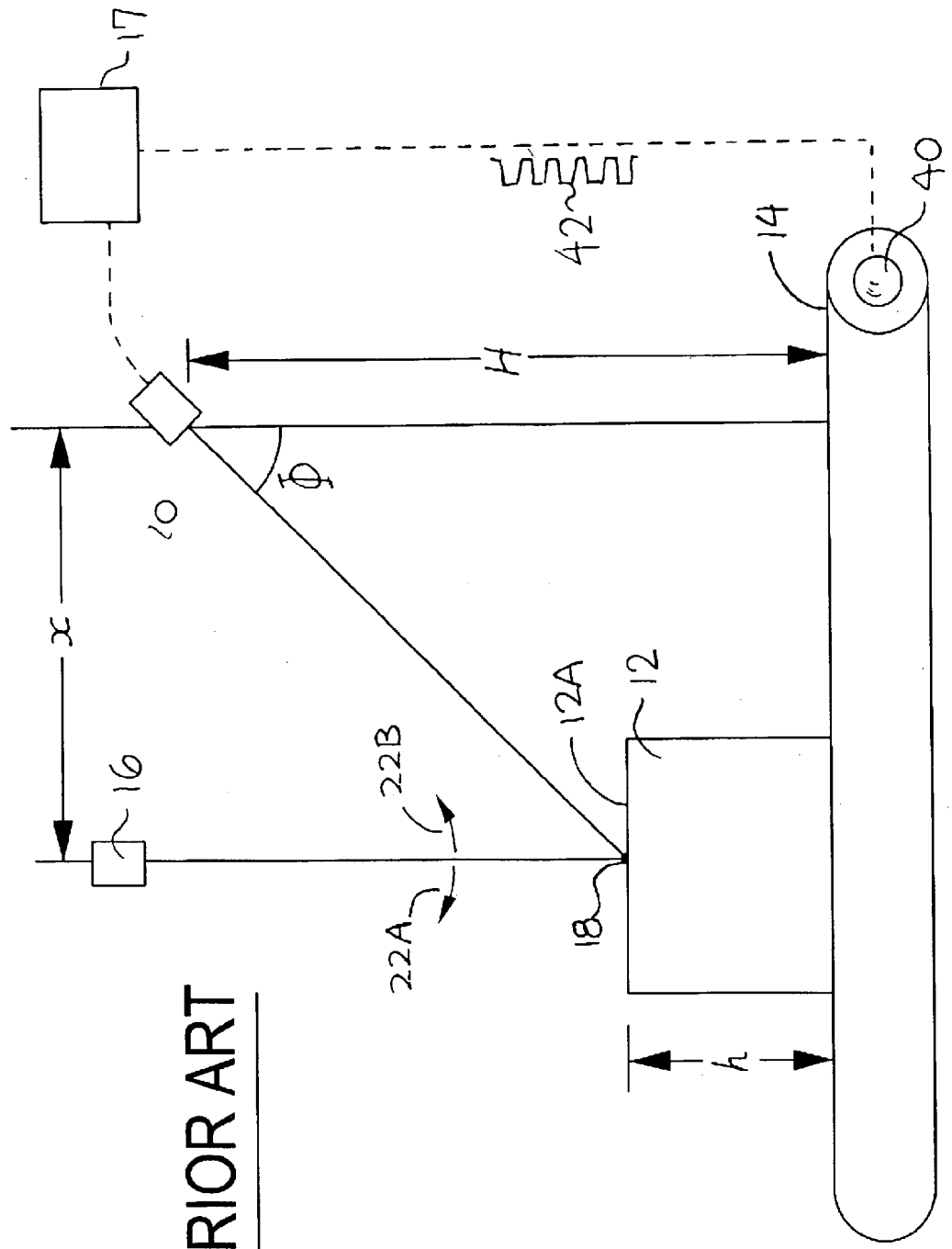
FIG. 1 is a diagram illustrating the angles and distances used in determining box height in some prior art systems.

FIG. 1 illustrates a simple prior art system for measuring the height h of a box 12 sitting on a conveyor belt 14. The system uses a projector 16 to project a line of light 18 on the upper surface 12A of box 12 from a location directly above box 12. A camera 20 is located a distance H above the belt and a horizontal distance x from projector 16. Camera 20 detects line 18. A computerized controller 17 computes the height h of box 12 by applying the formula:

$$h = H - \frac{x}{\tan\Phi} \quad (1)$$

where $\Phi$ is the angle at which camera 20 views line 18. As the box height increases, $\Phi$ increases (i.e. the apparent position of line 18, as viewed by camera 20, moves to the left as viewed in FIG. 1). As the box height decreases, $\Phi$ decreases (i.e. the apparent position of line 18, from the perspective of camera 20, moves to the right as viewed in FIG. 1).

It can be appreciated that if projector 16 becomes tilted as indicated by arrow 22A so that line 18 moves to the left (as seen in FIG. 1) then the system will indicate that box 12 is taller than the actual value of h. If projector 16 becomes tilted as indicated by arrow 22B so that line 18 moves to the right (as seen in FIG. 1) then the system will indicate that box 12 is shorter than the actual value of h. Motion of camera 20 will cause similar errors.

This Invention

Figure 2:
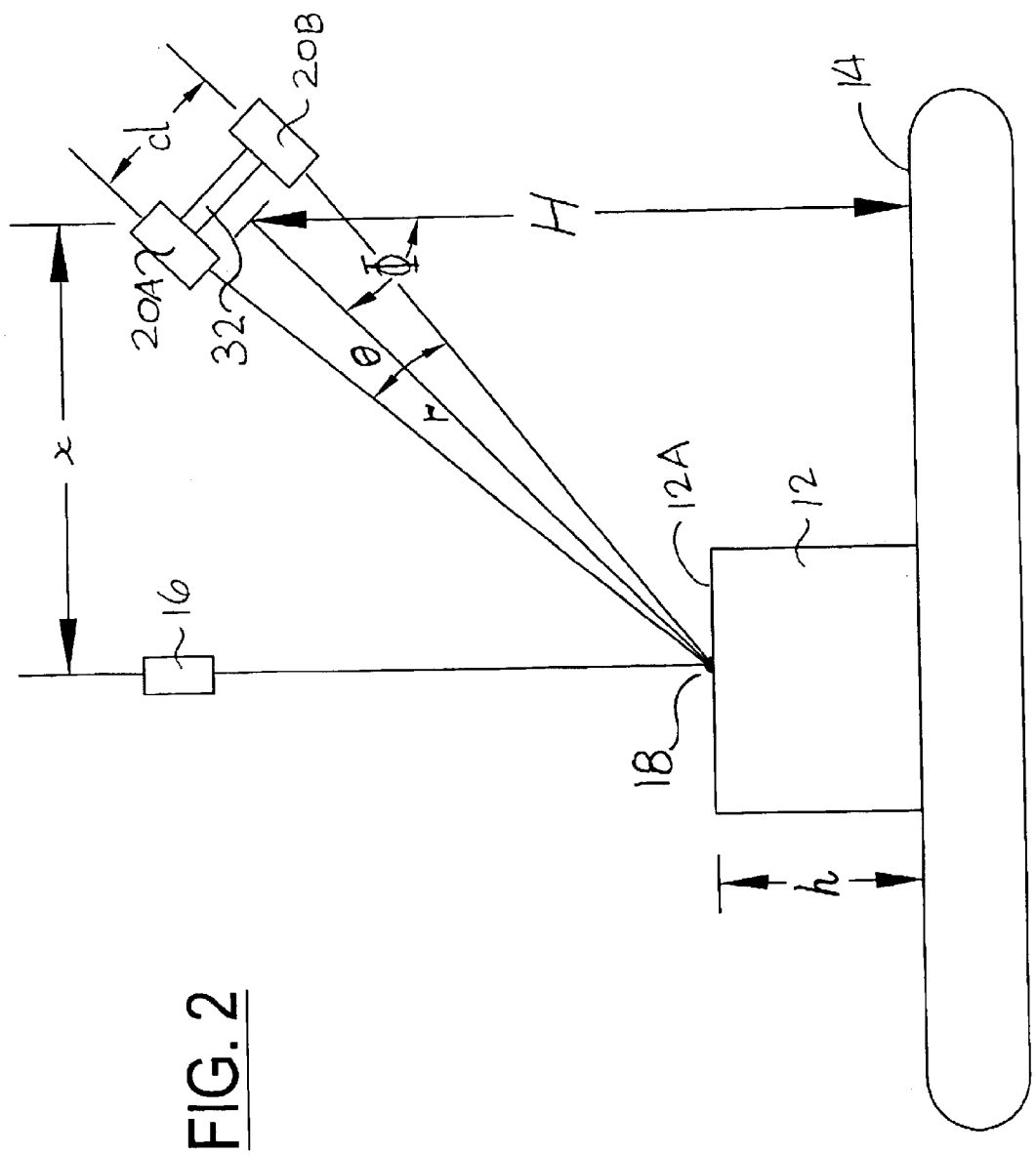
FIG. 2 is a schematic side elevational view of a system according to this invention.

FIG. 2 shows schematically a system 30 for measuring the height of a box 12 according to this invention. System 30 has a pair of digital cameras 20A and 20B which are rigidly mounted to one another on a frame 32 and are located a distance H above conveyor 14. Preferred embodiments of system 30 also include a third digital camera 20C (see FIG. 3). Cameras 20A and 20B are separated by a distance d. Cameras 20A, 20B and 20C typically each comprise an array of CCDs or other light-sensitive devices. Each of the light sensitive devices generates a signal indicating the intensity of light in a pixel within the image.

Cameras 20A and 20B are calibrated relative to each other as described below. Digital cameras 20A and 20B image projected line 18 on top surface 12A of box 12 substantially simultaneously.

Preferably d is significantly less than x, which is the distance between the assembly of cameras 20A and 20B and projector 16. In this disclosure, a first distance is "significantly less than" a second distance if the first distance is less than about ½ of the second distance. Most preferably, d is less than about ¼ of x.

Images captured by cameras 20A, 20B and 20C (if present) are provided to a controller and image processing unit 34 (FIG. 3) for analysis. Controller 34 may comprise a programmed general purpose computer equipped to receive digital images generated by cameras 20A, 20B and 20C. Controller 34 preferably comprises computer software which:

- receives the raw digital images from cameras 20A, 20B, and 20C;
- identifies laser spots in the images from cameras 20A and 20B;
- fits lines to the laser spots;
- identifies end points of the lines; and,
- from the positions and end points of the lines, computes the box height and box top dimensions.

The actual position of line 18 (FIG. 2), and the vertical distance h of line 18 above the top surface of conveyor 14 can be determined by triangulation. It is a straightforward image processing task to determine both the distance r to line 18 and the angle $\Phi$ from the images captured by cameras 20A and 20B. Changes in the position of projector 16 do not affect the accuracy of the measurements of height h. Cameras 20A and 20B can be reasonably close together. Any segment of line 18 which is parallel to the plane of conveyor belt 14 can be assumed to be part of a box 12. The distance by which that line segment is spaced apart from conveyor belt 14 is equal to the height h of box 12. Although cameras 20A and 20B cannot see the lower face of box 12 (which is opposed to face 12A), it is assumed that the lower face of box 12 lies in the known plane of conveyor 14.

In most practical systems according to the invention there will be some "noise" in the images produced by cameras 20A and 20B. For example, a few pixels not corresponding to line 18 may be illuminated by scattered light from projector 16. To prevent these noise pixels from affecting the determination of the position of line 18 by controller 34, controller 34 preferably fits lines to sets of spots in a two step process wherein a line is first fitted to all of the spots, spots not on or near to the fitted line are discarded to yield a reduced set of spots from which noise spots have been eliminated, and then another line is fit to the reduced set of spots.

In the examples shown in the drawings, boxes 12 are singulated. However, the invention does not require boxes to be singulated. Line 18 may have segments which pass over the tops of several boxes 12. The heights of each of the boxes can be determined from the spatial position of the corresponding segment of line 18.

Preferably projector 16 is of a type which projects light having a greatest intensity in a narrow range of wavelengths. For example, projector 16 may comprise a laser light source. Suitable projectors 16 are commercially available. An example of a projector 16 which may be used in the invention is the model SNF-501L-670S-30-75 projector available from Lasiris of Saint-Laurent, Quebec, Canada. Each of digital cameras 20A and 20B is preferably equipped with a narrow bandpass filter 21 which passes light from line 18 but which blocks most light of other wavelengths. This facilitates identifying line 18 in the images captured by cameras 20A and 20B.

Figure 3:
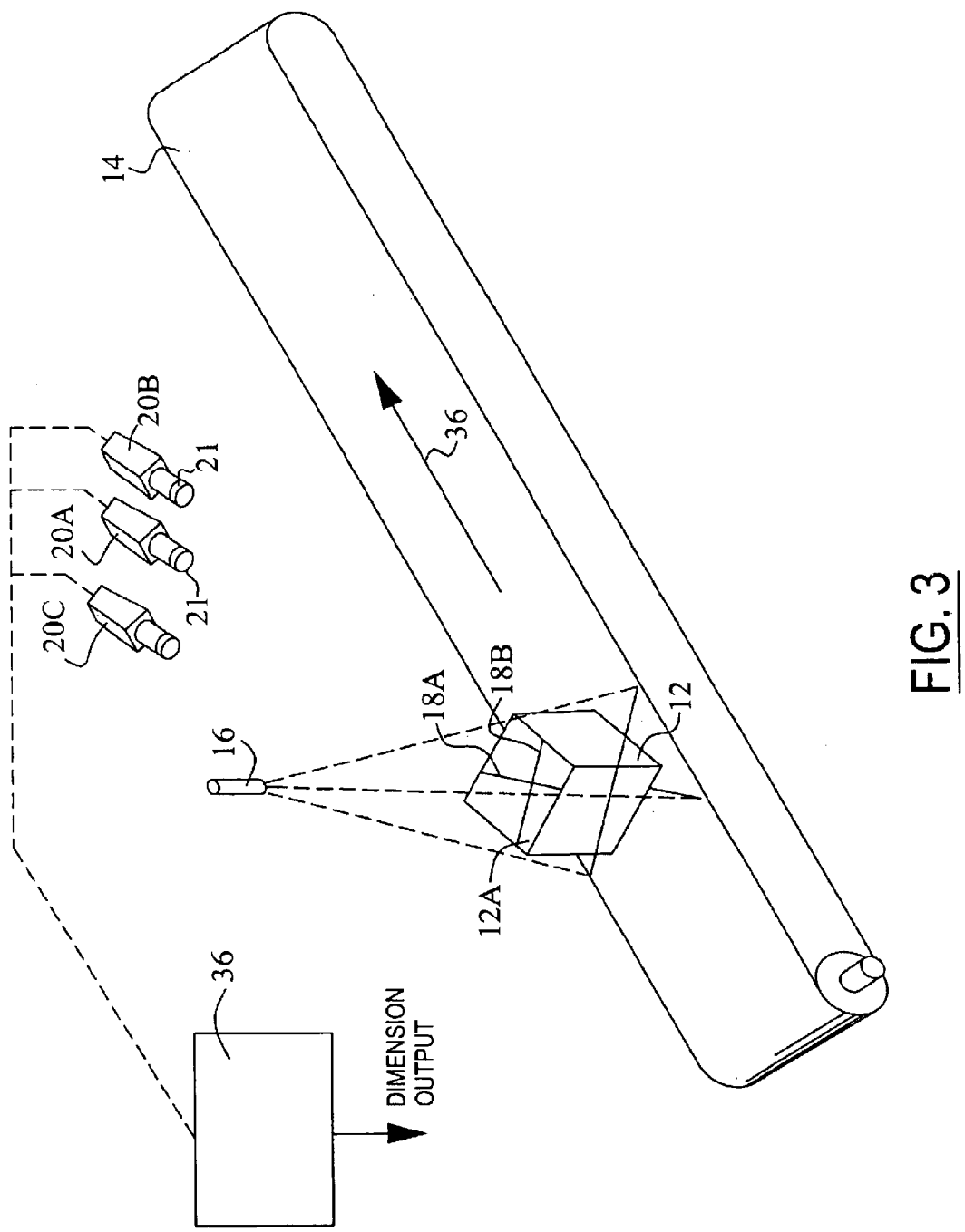
FIG. 3 is a partially schematic isometric view of a box measuring system according to a preferred embodiment of the invention.
Figure 4:
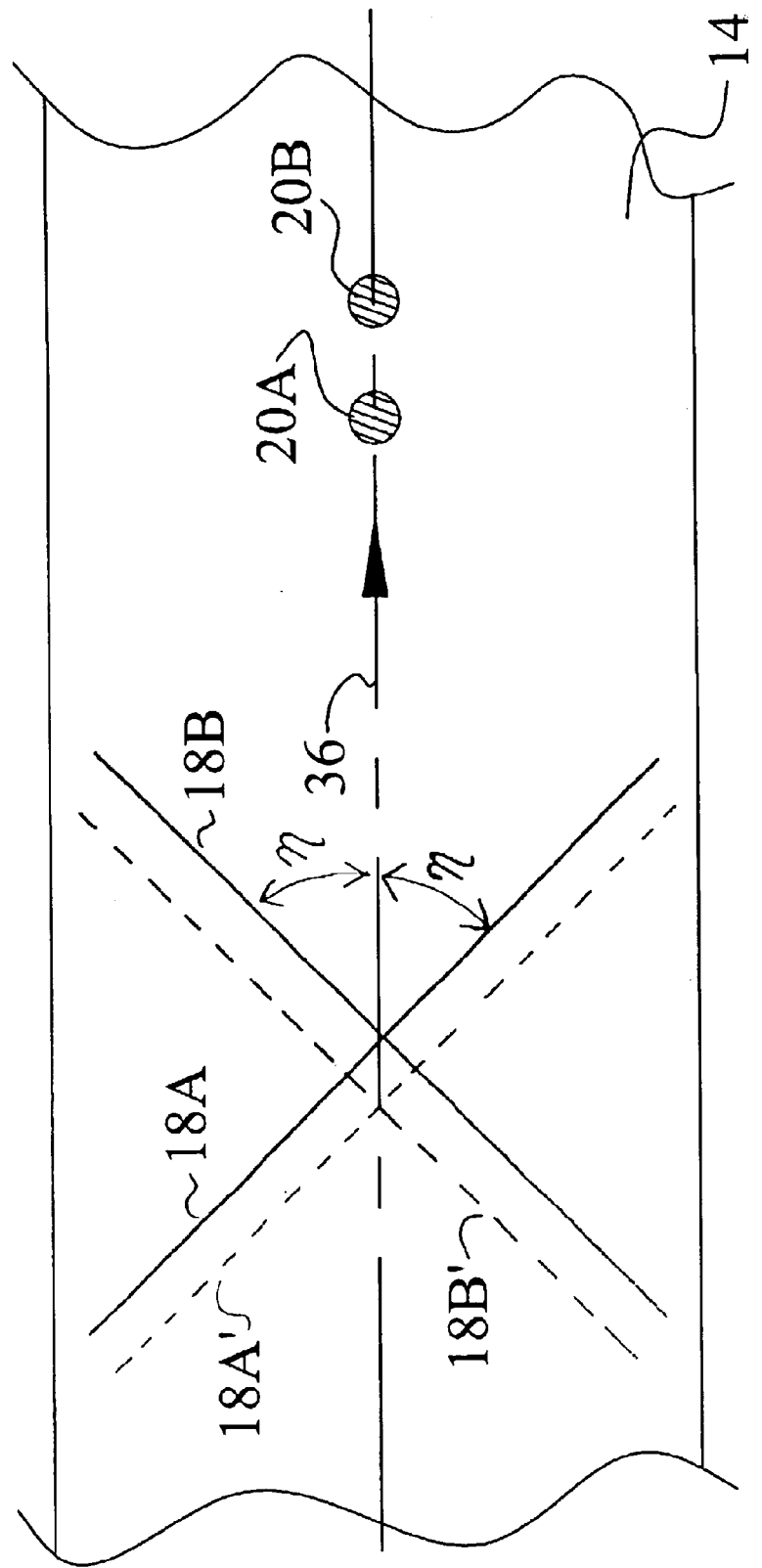
FIG. 4 is a schematic top view of a system according to the invention.

The length and width of box 12 may be determined by identifying points around a perimeter of top surface 12A. As shown in FIG. 3, in the currently preferred embodiment of the invention projector 16 projects a pair of lines 18A and 18B on top surface 12A. Each of cameras 20A and 20B captures an image of lines 18A and 18B. Preferably lines 18A and 18B are perpendicular to one another. Preferably lines 18A and 18B are both oriented so that each of lines 18A and 18B have sharp discontinuities at the peripheral edges of top surface 12A when viewed from the locations of cameras 20A and 20B. The apparent displacement of each of lines 18A and 18B should be close to being orthogonal to the orientation of the line. In a preferred embodiment of the invention, lines 18A and 18B are symmetrical when viewed from the locations of cameras 20A and 20B. Preferably each of lines 18A and 18B is oriented at an angle $\eta$ (FIG. 4) of about 45 degrees to a direction of motion 36 of boxes 12. As best shown in FIG. 4, lines 18A and 18B are preferably located in line with the baseline of cameras 20A and 20B, with the cameras located at an angle of either 90 degrees or 0 degrees to the direction of motion 36.

Cameras 20A and 20B are preferably located reasonably far from projector 16 so that small steps in height will produce significant discontinuities in lines 18A and 18B. Lines 18A' and 18B' in FIG. 4 illustrate the apparent displacements of lines 18A and 18B respectively which occurs when lines 18A and 18B are projected onto the top surface of a box instead of onto conveyor belt 14. By locating these discontinuities controller 34 can locate points on the peripheral edge of top surface 12A.

Controller 34 determines the length and width of top surface 12A by fitting a rectangle to the points so located. Controller 34 may, for example, measure the displacements between pairs of the peripheral points to identify sets of peripheral points which lie on each of the four sides of a rectangle. The displacement vectors between all pairs of peripheral points which lie on the same side of a rectangle will have the same direction. When this has been done, any erroneous peripheral points (which do not lie on any of the rectangle sides) can be discarded. Straight lines can then be fitted to each of the sets of peripheral points. Since the camera geometry is known, the dimensions of the box top can be directly computed once the lines have been determined.

To increase the accuracy with which lines 18A and 18B are located, controller 34 preferably mathematically fits one or more straight lines to fit the maximum pixel intensities in an image. Most preferably controller 34 separately locates points of discontinuity in lines 18A and 18B using images from both cameras 20A and 20B and averages the positions of corresponding end points obtained from each of the two images together to obtain better estimates of the actual locations of the endpoints.

Figure 5:
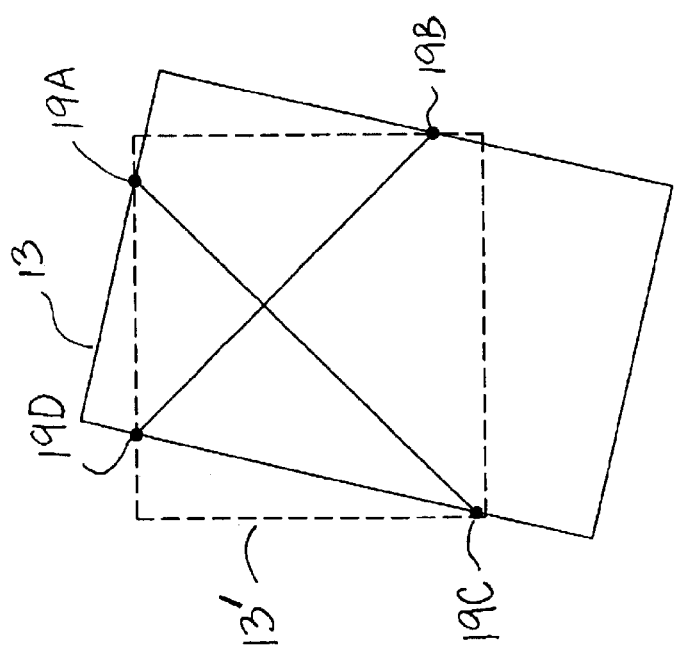
FIG. 5 is a sketch illustrating that, in general, four points do not uniquely specify the size of a rectangular figure; and, FIGS. 6A through 6D illustrate the use of a sequence of images to detect points around the periphery of a box top.
Figure 6B:
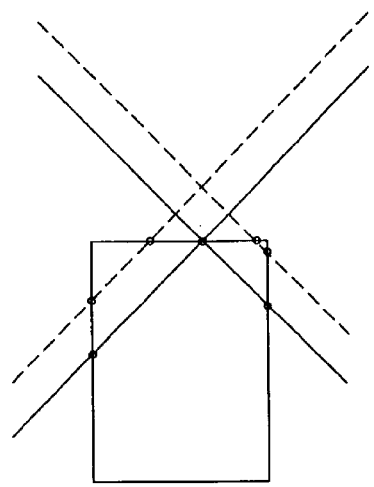
Figure 6D:
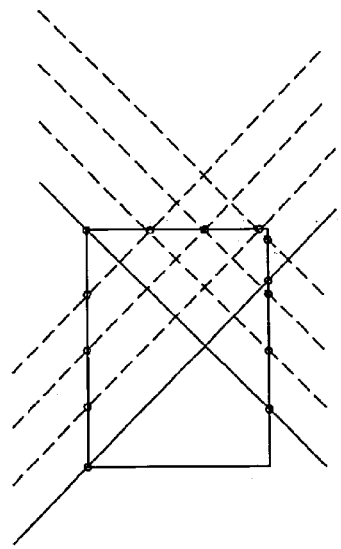
Figure 6A:
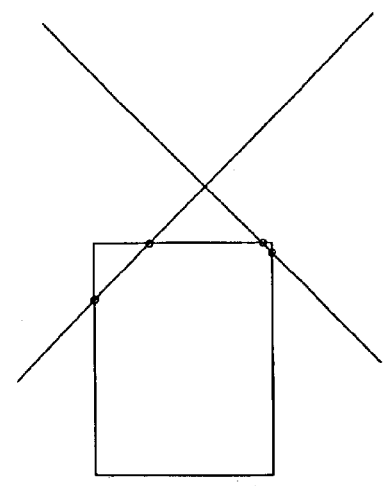
Figure 6C:
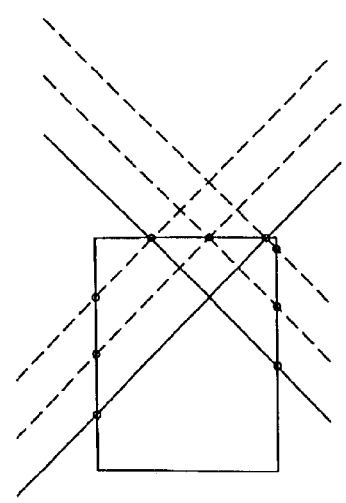

It is not possible to uniquely fit a rectangle to four points when the orientation of the rectangle is not known in advance. FIG. 5 shows how the same endpoints 19A, 19B, 19C and 19D are consistent with two box tops 13 and 13' which have completely different sizes. Therefore, one needs to obtain more than four endpoints. This is accomplished in one embodiment of the invention by combining multiple sets of endpoints collected as conveyor 14 carries box 12 along in direction 36. Since controller 34 can determine the time intervals by which sequential digital images are obtained by cameras 20A and 20B, sets of endpoints determined from successive images captured by the digital cameras may be combined into a composite if the speed of conveyor belt 14 is known. FIGS. 6A through 6D illustrate the combining of endpoints from sequentially captured images. For typical sizes of box, more endpoints can be readily captured than are shown in FIGS. 6A through 6D. For example, if conveyor 14 is moving at 20 meters per minute and camera 20C acquires 24 images per second then conveyor 14 will move by only about 1.4 cm between successive images taken by camera 20C.

One non-preferred way to determine the speed of conveyor belt 14 is to provide a sensor, such as an encoder 40 on conveyor 14. which produces a signal 42 which indicates the speed of conveyor 14. Signal 42 can be provided as an input to controller 34.

In the currently preferred embodiment of the invention, the speed and direction of conveyor belt 14 is measured with the use of a third digital camera 20C. Camera 20C periodically acquires an image of boxes 12 on conveyor belt 14. Controller 34 can determine the number of pixels and direction by which each image must be shifted so that the correlation with a previous image is maximized. Once this displacement is known in pixels the actual speed of conveyor belt 14 can be readily determined from the known focal length of camera 20C and the known position and orientation of camera 20C relative to conveyor belt 14.

Generally applicable techniques for measuring the correlation between images and techniques for determining the vector displacement required to maximize the correlation between two images (also known as "optical flow") are well known to those skilled in the art of image processing and will not be described here in detail.

It can be appreciated that to determine the dimensions of a box top, as described above, it is necessary to know the speed at which the box is being moved by conveyor 14. In the preferred embodiment of this invention, the speed of the box is determined by using optical flow on the box top 12A to determine the actual distance travelled by boxes on conveyor 14 between successive images captured by camera 20C. If the location of a box top represented in an image from camera 20C were known relative to the location of camera 20C then one could obtain the motion of conveyor 14 by performing correlation between two images from camera 20C taken at different times (while ignoring the lines of light from projector 16 which do not move with the box). The speed at which the box is carried by conveyor 14 could then be determined from the time between the images and the known characteristics of camera 20C. However, to use this optical flow technique to determine the speed at which the box is moving one must know where the box is, or equivalently the dimensions of the box. This information is not initially known.

This problem is addressed by beginning with a crude motion estimate to generate a preliminary model of the box top and then using that crude model to refine the motion estimate. Controller 34 may provide an initial motion estimate by assuming that conveyor 14 is carrying boxes at a constant velocity. If this is the case then, in a sequence of three images taken at times which are equally spaced apart the box should move the same distance in the period between the times that the first and second images are acquired as it moves in the period between the times that the second and third images are acquired. The positions of the line(s) projected by projector 16 are known by processing the images captured by cameras 20A and 20B, as described above. However, these lines do not move with conveyor 14. Controller 34 can obtain the motion of the box by:

correlating the first and third images;

assuming that the displacement between the second image and the first image is equal to and opposite in direction to the displacement between the second image and the third image; and, measuring the displacements of only the image points in the first and third images which correspond to the line(s) projected by projector 16 in the second image. The actual motion of the box can then be determined from the known characteristics of camera 20C, the known position of the line(s) projected by projector 16 and the displacement between the first and third images. The computations performed in controller 34 can be facilitated by transforming the image from camera 20C so that the optical axis of camera 20C is perpendicular to the plane of conveyor 14 (and hence perpendicular to the planes of the tops of boxes). The result is that all points on the box top will have the same relative motion in image space. Predicting the current motion from previous motion estimates reduces the amount of searching required to locate the points to compare in the first and third images. Camera 20C preferably takes a continuous series of images and the estimated speed of conveyor 14 is continuously updated.

Lines 18, 18A or 18B, in the field of view of camera 20C should be ignored when taking the correlation between the first and third images because they do not move with conveyor 14. Camera 20C is preferably not equipped with a narrow bandpass filter 21. Camera 20C may be equipped with a filter (not shown) which blocks light of the wavelength emitted by projector 16. In the preferred alternative, controller 34 synthesizes images which lack lines 18, 18A and/or 18B. One way to do this is by pulsing the light from projector 16 so that controller 34 periodically receives an image from camera 20C in which projector 16 is off. Controller 34 can use its best previous estimate of the motion of conveyor 14 to simply interpolate the image data from images in which projector 16 is turned off in order to remove the projector lines from other images taken by camera 20C.

Camera 20C is preferably pointing directly down toward the top surface of conveyor belt 14. It may be possible to use system 30 to measure the dimensions of boxes which are not singulated. If boxes 12 are not singulated then they should be placed on conveyor belt 14 so that any lines 18, 18A, 18C on the top surface 12A of any one box are not obscured from cameras 20A and 20B by some other box. Boxes 12 should not be placed on top of one another. Very tall boxes should not be placed in front of shorter boxes. Boxes should also be placed so that individual box tops 12A can be distinguished from one another. This may be accomplished, for example, by leaving a gap of a few centimeters between adjacent boxes.

System 30 may be initially calibrated by installing projector 16 and an assembly comprising cameras 20A and 20B above a conveyor 14. It is not necessary to align either projector 16 or the camera assembly with great accuracy. Next, cameras 20A and 20B are used to acquire images of lines 18 generated by the projector 16 on a surface at the level of the surface of conveyor 14. The lines may be projected directly onto belt 14 if it is sufficiently reflective. From the acquired images controller 34 establishes the plane of the surface of conveyor 14. This preferably involves identifying the lines projected by projector 16 in the images and fitting intersecting straight lines to each of the acquired images, as described above. Pixels which are imaging a point on a line 18 will be much brighter than any other pixels due to filters 21. After controller 34 has identified pixels which lie on lines 18 in the images from each camera then linear regression techniques may be used to fit the best lines to the points.

Controller 34 then stores calibration information characterizing the plane of conveyor 14 so that the heights h of objects on the conveyor may be determined as described above. The calibration information is determined by the orientation of cameras 20A and 20B relative to the surface of conveyor 14 as well as the distance from cameras 20A and 20B to conveyor 14. The direction of motion of conveyor 14 in the plane of its surface may be determined, for example, by placing an easily recognizable object on conveyor 14 and determining the direction moved by the object between successive images captured by cameras 20A and 20B. The object may, for example, be a small LED or other light source which emits light of a wavelength which will be passed by filters 21.

As is apparent from this disclosure, a system according to he preferred embodiment of the invention has the advantages that:

it has no moving parts;

it is not necessary for projector 16 to be completely rigidly affixed with respect to cameras 20A and 20B the system does not fall out of calibration if the alignment or position of projector 16 changes slightly;

a long baseline may be provided between projector 16 and cameras 20A and 20B;

the endpoints of lines 18A and 18B can be accurately determined by combining information from both of cameras 20A and 20B;

the system can automatically measure the speed and direction in which objects under study are being moved;

objects do not necessarily need to be singulated;

the system can be designed so that any errors will be so as to tend to under estimate rather than overestimate the sizes of objects being measured.

As will be apparent to those skilled in the art in the light of the foregoing disclosure, many alterations and modifications are possible in the practice of this invention without departing from the spirit or scope thereof. For example:

while it is preferable to provide a projector 16, or projectors which generate intersecting lines 18A and 18B as shown in FIG. 3, a single line 18 may be used if the ratio of belt speed to camera acquisition rate is low enough to provide sufficient accuracy. Where a single laser line is used it is possible to have uncertainty in the size of the box top of as much as twice the distance moved by the box between subsequent exposures.

Instead of, or in addition to, intersecting lines 18A and 18B one or more projectors could be used to project a number of non-intersecting lines on the tops of boxes 12.

Projector 16 could project additional sets of intersecting lines in addition to intersecting lines 18A and 18B.

Instead of, or in addition to acquiring multiple sets of endpoints for determining the length and width of objects one or more projectors could be used to project a dense enough grid of lines on the top surfaces 12A of the objects that enough endpoints to determine the size of any one of the objects could be obtained from a single image thus removing the need to determine the motion of the conveyor.

Instead of using optical filters 21 to ensure that the images of lines 18, 18A or 18B can be readily identified, controller 34 could use image subtraction to isolate the lines. This can be done by first obtaining an image of the box 12 without any lines 18 and then subtracting this image from the image of the box with lines 18, 18A or 18B as described above. If this is done, then the function of camera 20C may be combined with the function of one of cameras 20A and 20B.

More than three cameras may be used to image lines 18, 18A or 18B. Accordingly, the scope of the invention is to be construed in accordance with the substance defined by the following claims.

What is claimed is:

1. A method for measuring dimensions of cuboid objects, the method comprising:

providing a cuboid object having a first face in a known plane;

projecting a line of light onto a second face of the object, the second face opposed to the first face;

obtaining, at first and second spaced apart cameras, first and second images of the line of light; and, determining a distance between the line of light and the known plane from the first and second images by using data from the first image together with data from the second image in a triangulation calculation.

2. The method of claim 1 wherein the line of light comprises light of a wavelength and obtaining the first and second images of the line of light comprises passing light from the line of light through a band pass filter before imaging the line of light at the first and second cameras.

3. A method according to claim 1 wherein obtaining the first and second images of the line of light comprises synthesizing an image of the object without the line of light, obtaining an image of the object with the line of light and subtracting the synthesized image from the obtained image.

4. The method of claim 1 wherein the object is moving and the method comprises obtaining the first and second images substantially simultaneously.

5. The method of claim 4 wherein the first and second cameras are displaced from one another in a direction generally parallel to a direction of motion of the cuboid object.

6. The method of claim 4 wherein the first and second cameras are displaced from one another in a direction generally perpendicular to a direction of motion of the cuboid object.

7. The method of claim 1 comprising identifying a segment of the line of light which is spaced apart from the known plane and locating endpoints of the identified segment.

8. The method of claim 1 wherein the first and second images each comprise an array of pixels and the method comprises fitting straight lines to pixels imaging the line of light.

9. The method of claim 1 wherein a distance between the first and second cameras is substantially less than a distance between either of the cameras and a projector which projects the line of light.

10. The method of claim 1 wherein the object is moving.

11. The method of claim 10 comprising repeating obtaining, at first and second spaced apart cameras, first and second images of the line of light, identifying a segment of the line of light which is spaced apart from the known plane, locating endpoints of the identified segment a plurality of times to obtain a plurality of sets of endpoints and fitting a rectangle to the plurality of sets of endpoints.

12. The method of claim 10 comprising repeating obtaining, at first and second spaced apart cameras, first and second images of the line of light, identifying a segment of the line of light which is spaced apart from the known plane and locating endpoints of the identified segment a plurality of times to obtain a plurality of sets of endpoints.

13. The method of claim 12 comprising determining a speed of motion of the object by capturing successive images of the object at spaced apart times and determining a displacement required to maximize a correlation between the successive images.

14. The method of claim 13, wherein the successive images are obtained with a third digital camera.

15. The method of claim 1 comprising projecting a second line of light on the object.

16. The method of claim 15 wherein the first and second lines of light intersect.

17. The method of claim 16 wherein the first and second lines of light are substantially perpendicular to one another.

18. The method of claim 17 wherein the object is moving in a direction of motion and each of the first and second lines of light is oriented at an angle of about 45 degrees to the direction of motion.

19. A method for measuring dimensions of cuboid objects, the method comprising:
providing a moving cuboid object having a first face in a known plane;
projecting a line of light onto a second face of the object, the second face opposed to the first face;
obtaining, at first and second spaced apart cameras, first and second images of the line of light;
determining a distance between the line of light and the known plane from the first and second images by triangulation; and,
determining a speed of motion of the object by acquiring first, second and third images of the object, the second image including points corresponding to at least a portion of the line of light, determining a correlation between the first and third images and measuring a displacement between points on the object in the first and third images corresponding to the line of light in the second image.

20. The method of claim 19 wherein the first, second and third images are acquired by a third camera.

21. The method of claim 20 comprising transforming the images produced by the third camera so that the apparent optical axis of the third camera is perpendicular to a plane of a top surface of the object prior to determining a correlation between the first and third images.

22. The method of claim 19 comprising removing the line of light from the first and third images prior to determining a correlation between the first and third images.

23. The method of claim 22 wherein removing the line of light from one image comprises using a previous estimate of the motion of the object to locate a portion of a different image depicting an area corresponding to the location of the line of light in the one image and replacing an area including the line of light in the one image with the area from the different image.

24. A system for measuring dimensions of cuboid objects, the system comprising:
a camera assembly comprising first and second spaced apart digital cameras having a common field of view, the digital cameras rigidly coupled to one another;
a projector spaced apart from the camera assembly, the projector mounted to project a line of light on an object in the field of view; and,
a controller connected to receive a first image from the first camera and a second image from the second camera and configured to use data from the first image together with data from the second image in a triangulation calculation to determine a dimension of the object;
wherein a distance between the first and second cameras is substantially less than a distance between the camera assembly and the projector.

25. The system of claim 24 comprising a conveyor adapted to move objects through the field of view and a sensor for determining a speed of motion of the objects.

26. The apparatus of claim 25 wherein the first and second cameras are displaced from one another in a direction generally parallel to a direction of motion of the conveyor.

27. The apparatus of claim 25 wherein the first and second cameras are displaced from one another in a direction generally perpendicular to a direction of motion of the conveyor.

28. The system of claim 25 wherein the sensor comprises a third camera and a controller, the third camera obtaining successive images of the conveyor and the controller adapted to determine a displacement for maximizing a correlation between the successive images.

29. The system of claim 28 wherein the projector projects light concentrated in a wavelength range and the first and second cameras comprise bandpass filters which pass light in the wavelength range and block light of other wavelengths.

30. The system of claim 29 wherein the third digital camera lacks a bandpass filter.

31. The system of claim 28 wherein the third digital camera is oriented to look directly down upon the conveyor from above.

32. The system of claim 24 wherein the projector projects light concentrated in a wavelength range and the first and second cameras comprise bandpass filters which pass light in the wavelength range and block light of other wavelengths.

33. A method for measuring dimensions of cuboid objects, the method comprising:

provoding a cuboid object having a first face in a known plane;

projecting a line of light onto a second face of the object, the second face opposed to the first face;

obtaining, at first and second spaced apart cameras, first and second images of the line of light; and, determining a distance between the line of light and the known plane from the first and second images by using data from the first image together with data from the second image in a triangulation calculation;

wherein the object is moving the method further comprises determining a speed of motion of the object by acquiring first, second and third images of the object, the second image including points corresponding to at least a portion of the line of light, determining a correlation between the first and third images and measuring a displacement between points on the object in the first and third images corresponding to the line of light in the second image.

34. The method of claim 33 wherein the first, second and third images are acquired by a third camera.

35. The method of claim 34 comprising transforming the images produced by the third camera so that the apparent optical axis of the third camera is perpendicular to a plane of a top surface of the object prior to determining a correlation between the first and third images.

36. The method of claim 33 comprising removing the line of light from the first and third images prior to determining a correlation between the first and third images.

37. The method of claim 36 wherein removing the line of light from one image comprises using a previous estimate of the motion of the object to locate a portion of a different image depicting an area corresponding to the location of the line of light in the one image and replacing an area including the line of light in the one image with the area from the different image.

38. A system for measuring dimensions of cuboid objects, the system comprising:

a camera assembly comprising first and second spaced apart cameras having a common field of view, the first and second cameras rigidly coupled to one another;

a projector spaced apart from the camera assembly, the projector mounted to project a line of light on an object in the field of view; and a controller connected to receive a first image from the first camera and a second image from the second camera and configured to use data from the first image together with data from the second image in a triangulation calculation to determine a dimension of the object.

39. A method for measuring dimensions of cuboid objects, the method comprising:

providing a cuboid object having a first face in a known plane;

projecting a line of light onto a second face of the object, the second face opposed to the first face;

obtaining, at first and second spaced apart cameras, first and second images of the line of light; and, determining a distance between the second face and the known plane from the first and second images by using data from the first image together with data from the second image in a triangulation calculation.

* * * * *